US010225038B2

(12) United States Patent
Falk

(10) Patent No.: US 10,225,038 B2
(45) Date of Patent: Mar. 5, 2019

(54) PROVISION OF A SECURED REPLICA PSEUDO RANDOM NOISE SIGNAL

(71) Applicant: Rainer Falk, Poing (DE)

(72) Inventor: Rainer Falk, Poing (DE)

(73) Assignee: Siemens Aktiengesellschaft, München (DE)

( * ) Notice: Subject to any disclaimer, the term of this patent is extended or adjusted under 35 U.S.C. 154(b) by 168 days.

(21) Appl. No.: 14/751,430

(22) Filed: Jun. 26, 2015

(65) Prior Publication Data

US 2015/0381307 A1 Dec. 31, 2015

(30) Foreign Application Priority Data

Jun. 27, 2014 (DE) .................... 10 2014 212 467

(51) Int. Cl.
*H04L 9/00* (2006.01)
*H04K 1/02* (2006.01)
(Continued)

(52) U.S. Cl.
CPC ................. *H04K 1/02* (2013.01); *H04K 3/25* (2013.01); *H04K 3/825* (2013.01); *H04L 9/0656* (2013.01);
(Continued)

(58) Field of Classification Search
CPC ... H04K 1/00; H04K 1/02; H04K 3/90; H04L 9/0662; H04L 9/0668; H04L 2209/00; H04L 2209/08; G06F 21/86–21/88; G01S 19/01; G01S 19/13; G01S 19/24; G01S 19/243; G01S 19/30; H04B 1/69; H04B 1/707
See application file for complete search history.

(56) References Cited

U.S. PATENT DOCUMENTS 5,689,271 A * 11/1997 Lennen ................. G01S 19/215
342/352
7,484,081 B1 * 1/2009 Langhammer .......... G06F 21/76
326/8
(Continued)

FOREIGN PATENT DOCUMENTS

CN 101359044 A 2/2009
EP 2088705 A1 8/2009
(Continued)

OTHER PUBLICATIONS

European Office action for related European Application No. 15161816.2, dated Nov. 24, 2015, with English Translation.
(Continued)

*Primary Examiner* — Trong H Nguyen
(74) *Attorney, Agent, or Firm* — Lempia Summerfield Katz LLC

(57) ABSTRACT

A secure method and a secure provision unit provide a secured replica pseudo random noise signal for a receiver unit. A replica pseudo random noise code is modulated with a noise signal by a receiver-end provision unit. The replica pseudo random noise code has artificially produced noise superimposed thereon, so that the replica pseudo random noise code cannot be read from the noisy signal even at the receiver end, for example within a receiver or on a transmission path between provision unit and receiver.

20 Claims, 3 Drawing Sheets

(51) Int. Cl.
*H04K 3/00* (2006.01)
*H04L 9/06* (2006.01)

(52) U.S. Cl.
CPC .............. *H04L 9/0668* (2013.01); *H04K 3/46* (2013.01); *H04K 3/65* (2013.01); *H04K 3/90* (2013.01); *H04L 2209/08* (2013.01)

(56) References Cited

U.S. PATENT DOCUMENTS

| | | | | |
|---|---|---|---|---|
| 2002/0085716 | A1* | 7/2002 | Abdulkader | H04K 1/02 380/205 |
| 2005/0058292 | A1* | 3/2005 | Diorio | G06K 7/0008 380/270 |
| 2008/0001818 | A1* | 1/2008 | Cohen | G01S 19/07 342/357.44 |
| 2008/0169958 | A1* | 7/2008 | Cohen | G01S 19/015 342/14 |
| 2009/0022210 | A1 | 1/2009 | Matsumoto | |
| 2009/0046766 | A1* | 2/2009 | Avellone | G01S 19/30 375/142 |
| 2010/0124331 | A1* | 5/2010 | Park | H04B 1/707 380/268 |
| 2011/0274270 | A1 | 11/2011 | Rhoads | |

FOREIGN PATENT DOCUMENTS

| | | | | |
|---|---|---|---|---|
| GB | 1279224 A | * | 6/1972 | ............... H04K 1/02 |
| GB | 1279224 A | | 6/1972 | |

OTHER PUBLICATIONS

German Office action for related German Application No. 10 2014 212 467.0, dated Mar. 5, 2015, with English Translation.
German Office Action for German Application No. 201510360448.9, dated Jun. 4, 2018.

* cited by examiner

PROVISION OF A SECURED REPLICA PSEUDO RANDOM NOISE SIGNAL

This application claims the benefit of DE 102014212467.0, filed on Jun. 27, 2014, which is hereby incorporated by reference in its entirety.

FIELD

The disclosed embodiments relate to a method and a provision unit for providing a secured replica pseudo random noise signal for a receiver unit.

BACKGROUND

Pseudo random code sequences, also known as pseudo random noise codes (PRNC) or pseudo random number (PRN) codes, are used for radio transmission, for example. The codes are spread codes that prompt frequency spreading for an information signal. The wideband transmission means that such a signal has a high level of robustness toward interference. By way of example, spread sequences are used in satellite navigation systems such as GPS, Glonass, Beidou or Galileo. In this case, the received satellite signal is situated below a noise level. A receiver is capable of detecting and decoding the emitted signal only via correlation with an appropriate PRN code that the receiver itself has available. This is normally the identical PRN code that may already be available in the receiver, for example. It is also possible to refer to a replica PRN code, which is a reconstructed or simulated PRN code or a PRN code available as a second version.

Cryptographic PRN codes have been used. In this case, the code sequence is produced on the basis of a cryptographic key. A receiver is capable of generating the appropriate PRN code for decoding the received signal only if the receiver knows the PRN code used by the transmitter for transmitting the signal. For this, the receiver needs the cryptographic key.

The receiver, above all the signal processing on the receiver, needs to be protected against attackers by security mechanisms in complex fashion in this case. By way of example, an field programmable gate array (FPGA) on which the cryptographic signals are handled needs to be secured by emission protection or tamper-proofing in complex and hence expensive fashion.

Raw data has been digitized and recorded from a received GPS signal. The raw data is transmitted to a cloud service, so that the signal processing is performed on a server. The server is protected in a special way in this case, so that the security-critical cryptographic signal processing takes place in a secure computer center. However, this requires a large proportion of the server environment, including data transmission paths used, to be protected, again in complex fashion.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the disclosed embodiments may provide a secure method and a secure provision unit for providing a secured replica pseudo random noise signal for a receiver unit.

A method provides a secured replica pseudo random noise signal for a receiver unit, in which a replica pseudo random noise code is modulated with a noise signal by a receiver-end provision unit. In this case, the replica pseudo random noise code is protected by the noise signal that is modulated on or added. This prevents or at least significantly complicates the possibility of the replica pseudo random noise code contained in the secured signal being extracted therefrom.

A replica pseudo random noise code means a code sequence that is used in a correlation method at the receiver end in order to be able to detect or decode a received signal from a transmitter, the transmitter having used a pseudo random noise code associated with the replica pseudo random noise code for the purpose of modulating the signal. A replica pseudo random noise code together with a pseudo random noise code therefore forms a pair that needs to match, e.g., be identical, in respect of the bit sequence of the code so that the pseudo random noise code of the received signal is detectable or decodable at the receiver end. In the case of a cryptographically produced pseudo random noise code used by the transmitter, the appropriate, e.g., identical, symmetrical key is also present at the receiver end so that the appropriate replica pseudo random noise code is produced.

At the receiver end, the replica pseudo random noise code is modulated with a noise signal. That is to say that the replica pseudo random noise code has artificially produced noise superimposed on it, so that the replica pseudo random noise code cannot be read from the noisy signal even at the receiver end, for example within a receiver or on a transmission path between provision unit and receiver. Hence, the replica pseudo random noise signal is protected against the replica pseudo random noise code being read. The replica pseudo random noise signal is therefore secured as soon as the signal leaves the receiver-end provision unit. Manipulation protection or emission protection needs to be ensured at the receiver end only for a very limited area. Only the provision unit is provided with special protection, for example via tamper-proofing measures. The replica pseudo random noise code in need of protection is therefore provided for the receiver unit only in a form in which the code cannot feasibly be put to misuse. For instance, the code cannot be used, or can be used only to a restricted degree, to transmit an interference signal itself. Should the replica pseudo random noise code be available on the receiver in unsecured form, the code can be used in order to modulate an interference signal. A manipulated receiver is capable of therefore feigning being in possession of the original pseudo random noise code and hence being the legitimate sender of an actually manipulated signal, for example, a satellite signal.

The production of cryptographic pseudo random noise codes—and hence also of cryptographic replica pseudo random noise codes—involves a cryptographic key. The cryptographic algorithms associated therewith may be time-consuming and resource-using. The secured replica pseudo random noise signal may be deposited, e.g., stored, at the receiver end over a relatively long period, because misuse is not readily possible even when the secured replica pseudo random noise signal is read from a memory area. Hence, a receiver unit or a receiver may already receive and store the secured replica pseudo random noise signal even before signal processing that is to be performed, for example before a received signal is received. For the processing of a realtime-critical signal, the signal processing time may be reduced, because the secured replica pseudo random noise signal is already available.

According to one refinement, a modulated replica pseudo random noise signal is generated from the replica pseudo random noise code. The replica pseudo random noise code, which is a bit sequence, may be represented as a digitized signal. A modulation method therefore involves the receiver end first of all producing a modulated replica pseudo random noise signal from the replica pseudo random noise code before the further modulation steps are performed.

According to one refinement, the noise signal has a higher level than the modulated replica pseudo random noise signal. The replica pseudo random noise code is intended to be hidden in the additionally added, artificial noise. This warrants a level of the noise signal high enough for the characteristic code not to be able to be read. The noise signal is modulated onto the modulated replica pseudo random noise signal, which may be the digitized signal from the replica pseudo random noise code. A correlator provided with the replica pseudo random noise signal for decoding correlates the received signal with the replica pseudo random noise signal. The noise level is accordingly matched to the level of the modulated replica pseudo random noise signal.

According to one refinement, the secured replica pseudo random noise signal is correlated with a received signal received by the receiver unit. In this case, a received signal that may be received by the receiver unit is correlated, e.g., continuously, in a signal processing stage. Hence, sections in which a signal, for example a data transmission signal or a satellite signal, is recognized by virtue of the correlation, and sections in which a result of the correlation is that the receiver does not recognize a signal emitted by a transmitter, can alternate.

According to one refinement, a pseudo random noise code contained in a received signal received by the receiver unit may be decoded via a correlation method using the secured replica pseudo random noise signal. Hence, the signals from a transmitter that have been modulated with the pseudo random noise code may be recognized by the receiver unit. Only for matched pseudo random noise codes and replica pseudo random noise codes does the correlation method allow decoding of the received signal. The noise signal superimposed on the replica pseudo random noise code is not detrimental to the performance of the correlation in this case. The noise signal is used for the correlation and acts as an intentional source of interference. In a corresponding coding method that is robust when subject to interference to a certain degree, the decoding is still possible.

According to one refinement, a pseudo random noise signal contained in a received signal received by the receiver unit is evaluated via a correlation method. In this case, a time offset between the received signal with the pseudo random noise signal and the replica pseudo random noise signal produced for the receiver end may be ascertained. Time information or position information or distance information may also be determined, e.g., provided that a plurality of satellite signals are received by the receiver unit.

According to one refinement, the replica pseudo random noise code is generated by a replica pseudo random noise code generator of the provision unit or by an external replica pseudo random noise code generator that may be connected to the provision unit.

Because the replica pseudo random noise code is unsecured as such, transmission by an external unit warrants ensuring the integrity and non-monitorability of the transmission path. The replica pseudo random noise code generator is protected against reading or unauthorized access, e.g., via protective measures.

According to one refinement, the replica pseudo random noise code generated is a cryptographic replica pseudo random noise code. In this case, the secure production of the cryptographic replica pseudo random noise code is dependent on the availability and secrecy of a cryptographic key. The evaluation of a received signal with a pseudo random noise component via correlation with the replica pseudo random noise signal may therefore confirm information about the integrity of the received signal transmitted by the transmitter if the result of the correlation is a match between cryptographic pseudo random noise code and cryptographic replica pseudo random noise code. Hence, transmitter and receiver have the same cryptographic key.

According to one refinement, the noise signal is in the form of a random or pseudo random noise signal. In this case, the noise signal is intended to emulate natural, non-deterministic noise and needs to meet the requirements that firstly the replica pseudo random noise code is not meant to be recognizable in the modulated replica pseudo random noise signal and secondly the interference by the noise signal is not so great that the correlation with the received signal does not allow a pseudo random noise signal that is contained to be recognized.

According to one refinement, the replica pseudo random noise code is modulated by the provision unit by adding it to the noise signal. This is a low-complexity, e.g., resource-saving, modulation variant. However, other modulation methods are also suitable for forming a protected replica pseudo random noise signal from a replica pseudo random noise code and a noise signal. In principle, any modulators, e.g., a push-pull mixer, ring mixer or ring modulator, a transformer, or signal combination operations such as addition, subtraction, multiplication, table lookups, etc., may be used. These methods may be performed electronically, but also digitally in the form of digital signal processing by a digital signal processor (DSP), or by a digital signal processing arrangement on a programmable logic chip or FPGA or an application specific integrated circuit (ASIC) or a signal processing integrated circuit.

According to one refinement, the noise signal is generated by a noise generator of the provision unit or by an external noise generator that may be connected to the provision unit. The noise signal does not need to be specially protected against spying and may be provided by a separate unit that is suitable for this purpose.

According to one refinement, a level of the noise signal is generated so as to be constant over time or so as to be variable over time. The signal strength that may be expected for the received signal at the expected location of the receiver may be taken into account. The specific restriction that the receiver only detects a received signal if the signal strength thereof exceeds a threshold value may be set. If the receiver is at too great a distance from the expected location, it cannot detect the pseudo random noise signal despite the correlation method and presence of the appropriate replica pseudo random noise code. The specific effect that a receiver has only restricted robustness toward sources of interference, which are known as interferers, may also be achieved.

According to one refinement, the secured replica pseudo random noise signal is provided for the receiver unit by a security module or a security cloud server, e.g., continuously or in the form of individual sections or with the addition of supplementary information. The receiver may therefore be realized in distributed fashion and the provision unit may be in the form of an external unit, e.g., in the form of a security module or security cloud server, separately from a receiver unit. Because the secured replica pseudo random noise signal is protected against being read, it may be sufficient for the security module or the security cloud server to be protected against attackers by appropriate security measures. Hence, the area of a receiver to be protected by protective mechanisms may be substantially reduced in size. This protected, secured area may be realized on a server and the protected replica pseudo random noise signal may be provided via a network connection. The latter may additionally be protected by security mechanisms, such as a cryptographically secured communication link.

According to one refinement, the secured replica pseudo random noise signal has a marker for identifying a signal produced at the receiver end. Hence, a receiver of a received signal may, following decoding, recognize a supposed pseudo random noise signal, but then see, in addition to the supposed pseudo random noise signal, for instance, an Invalid marker or an Invalid marker signal or an Invalid marker code that reveals that said signal is a replica pseudo random noise signal with a marker, generated at the receiver end. This allows a receiver to distinguish whether a signal is an original signal, for example a satellite signal, or a signal emitted by a receiver end, e.g., a manipulated receiver. An Invalid marker signal may be contained in the replica pseudo random noise signal as a further pseudo random noise code beneath the noise signal. Despite knowledge of the Invalid marker pseudo random noise code, it is therefore barely possible to remove the Invalid marker signal from the replica pseudo random noise signal without destroying or altering the replica pseudo random noise code contained, e.g., the actual useful code that the receiver uses for the correlation and the coding, in the process.

A provision unit provides a secured replica pseudo random noise signal for a receiver unit having a modulator for modulating a replica pseudo random noise code with a noise signal. In this case, the modulator is designed to modulate signals, for example via addition.

According to one refinement, the provision unit additionally has a replica pseudo random noise code generator for providing the replica pseudo random noise code. According to one refinement, an external replica pseudo random noise code generator that may be connected to the provision unit is provided. The replica pseudo random noise code generator is protected against an attack, such as spying or reading, to a particular degree, because the replica pseudo random noise code is available in unsecured form.

According to one refinement, the noise signal is generated by a noise generator of the provision unit or by an external noise generator that may be connected to the provision unit. The noise generator may not be specially protected, beyond usual protective measures, against attacks because it is not possible to reconstruct any information about the secured replica pseudo random noise code from the noise signal.

According to one refinement, a key generator or key memory is designed to produce a cryptographic key, in which the cryptographic key may be used to generate a cryptographic replica pseudo random noise code.

According to one refinement, the provision unit is produced on a receiver having a receiver unit. In this case, the provision unit may be adjusted to be equipped with special protective mechanisms, such as particularly tamper-proofing apparatuses.

According to one refinement, tamper-proofing for recognizing manipulation or damage is provided for the provision unit.

DETAILED DESCRIPTION

Figure 1:
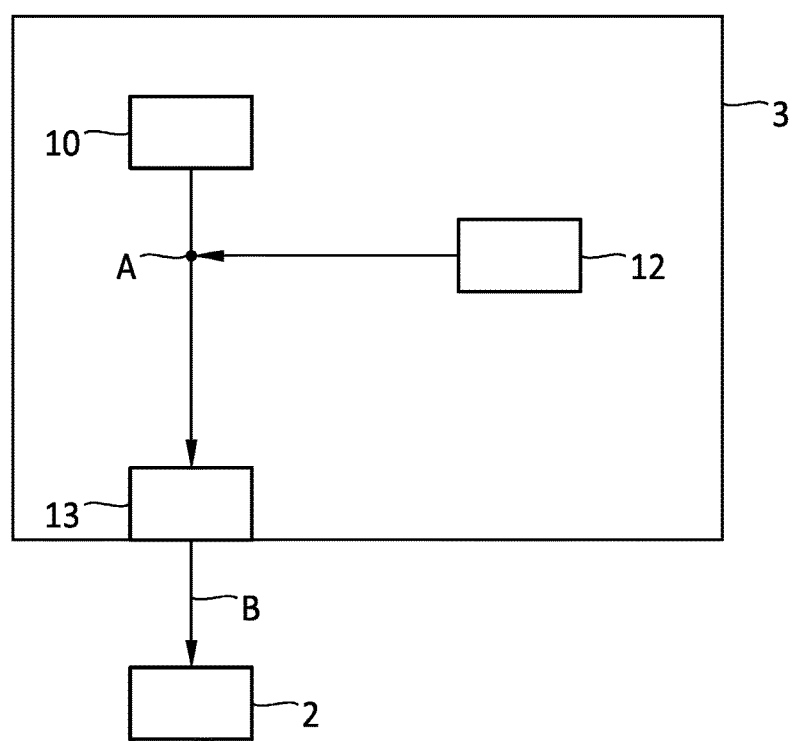
FIG. 1 shows a schematic illustration of a method for providing a secured replica pseudo random noise signal in accordance with one embodiment.

FIG. 1 schematically shows how, in a first step, modulation A of a replica pseudo random noise code 10 with a noise signal 12 by a receiver-end provision unit 3 is provided. The modulation generates a secured replica pseudo random noise signal 13 and, in a second step, provision B, provides it for a receiver unit 2. In this case, the modulation A is effected at a time before the provision B. Hence, only one secured replica pseudo random noise signal 13 is intended to be provided, e.g., outside a protected environment on a receiver.

Figure 2:
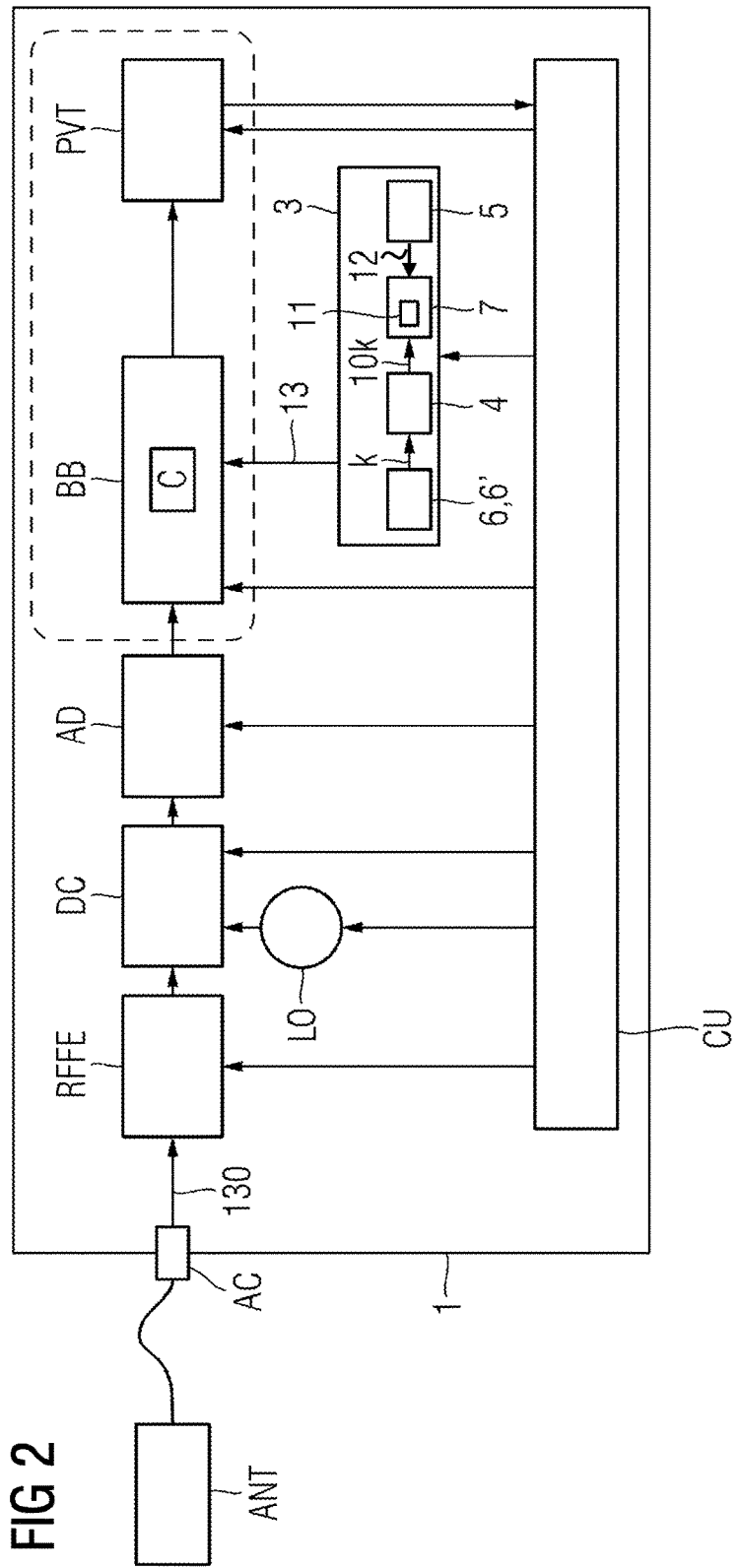
FIG. 2 shows a schematic illustration of a receiver with a receiver unit and a provision unit in accordance with one embodiment.

FIG. 2 schematically shows how a receiver 1 with an integrated provision unit 3 according to a first exemplary embodiment is designed. The receiver 1 has an antenna socked AC that may be used to connect an antenna ANT. A received signal 130 provided by the antenna ANT is first of all handled by a radiofrequency assembly, or radiofrequency front end (RFFE). In this case, filtering and amplification take place. The signal is then provided for a down converter DC that mixes the signal with a signal from a local oscillator LO and hence performs down conversion. The signal is then provided for an analog/digital converter AD. The latter forwards the digitized signal to the baseband processing BB. In this case, the receiver is controlled by a controller or control unit CU. The latter configures the individual assemblies, for example in order to select an appropriate frequency band by changing the frequency of the local oscillator LO or, by way of example, in order to configure the input filter of the radiofrequency assembly RFFE or, by way of example, in order to configure the bandwidth or sampling rate of the analog/digital converter or in order to select a modulation method for the baseband processing. The baseband processing BB may be realized on a field programmable gate array (FPGA) chip. The baseband processing BB is provided with a secured replica pseudo random noise signal 13 by a provision unit 3. For this, the provision unit 3 has a replica pseudo random noise code generator 4. A key generator 6 or key memory 6' is additionally provided for the purpose of producing or storing a cryptographic key K. The replica pseudo random noise code generator 4 is designed to generate a cryptographic replica pseudo random noise code 10K and selects a suitable cryptographic key K, e.g., according to the field of use or according to the location at which the receiver 1 is situated or according to the time at which signal processing is intended to take place. A plurality of keys may be provided, from which a respective specific replica pseudo random code is generated. By way of example, different keys are provided for different satellite systems. In addition, a noise generator 5 that produces a noise signal 12 is provided on the provision unit 3. The noise signal 12 and the cryptographic replica pseudo random noise code 10K are supplied to a modulator 7. The latter internally performs modulation of the cryptographic replica pseudo random noise code with the noise signal, in which a replica pseudo random noise signal 11, e.g., a digitized signal, is produced in an intermediate stage. The noise signal 12 has a higher signal level than the replica pseudo random noise signal 11. The modulator 7 may be used by the provision unit 3 to provide the replica pseudo random noise code 13 that is secured via the modulation with the noise signal 12. The provision B is effected at a receiver unit 2 of the receiver 1. This may be the baseband processing BB, for example, the FPGA, and also a PVT component PVT, which is a software implementation on a central processing unit (CPU), for example. The PVT component PVT is the evaluation unit of the receiver unit 2 and ascertains position, speed and time, for instance, from a satellite signal. The component of the baseband processing BB has a correlator C provided on it that correlates the secured replica pseudo random noise signal 13 with the digitized received signal. The secured replica pseudo random noise signal 13 is in a form in which it is not possible to tell whether the signal contains the underlying cryptographic replica pseudo random noise code 10K. The received signal 130 or the digitized received signal also cannot be regarded as having the presence of a pseudo random noise code on account of the superimposition with natural noise. The secured replica pseudo random noise signal 13 thus cannot be used to emit a faked signal with a valid pseudo random noise code.

Special protection against attackers may be provided for the provision unit 3 or at least for the modulator 7 with replica pseudo random noise code generator 4. This ensures that the replica pseudo random noise code becomes known to an attacker in a phase in which it is not yet hidden in the noise signal 12 as a result of this noise signal being modulated on. The provision unit 3 may be in the form of a tamper-proof cryptocontroller.

In comparison with conventional security measures, it is now no longer necessary to have physical protection for the entire receiver or the critical assemblies such as the baseband processing, the PVT component or the control unit. By way of example, tamper-proofing may be achieved by casting in epoxy resin or the introduction of an anti-drilling foil, what is known as a wire mesh. Advantageously, such a tamper-proofing apparatus may, according to this first exemplary embodiment, be reduced to a minimum within the provision unit 3. Lines or communication links that have hitherto transmitted critical signals are also now protected only within the provision unit 3. This allows a secure low-cost receiver to be realized.

Figure 3:
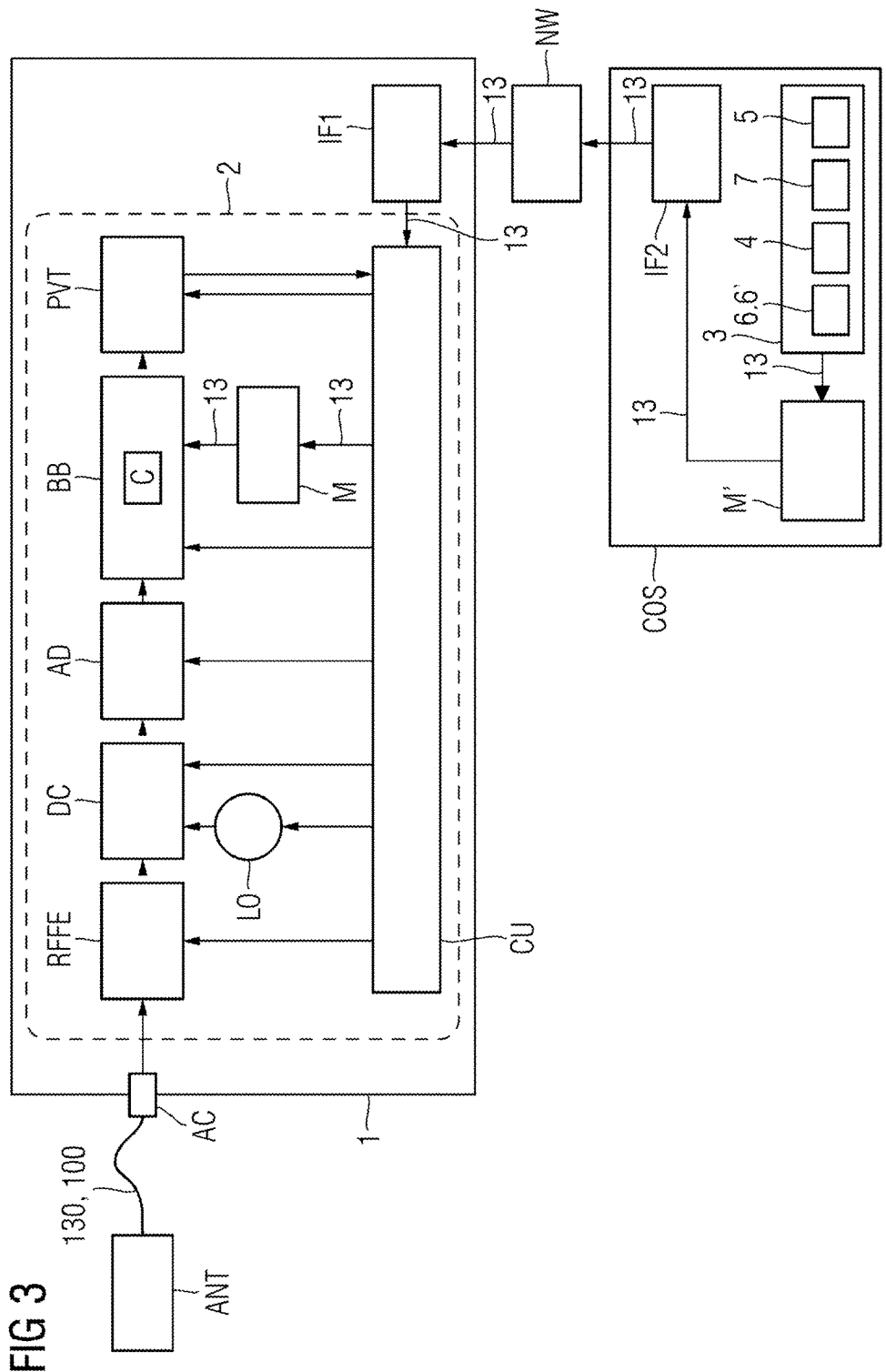
FIG. 3 shows a schematic illustration of a receiver with a receiver unit and a provision unit in accordance with another embodiment.

FIG. 3 shows a second exemplary embodiment, in which the receiver is realized in distributed fashion. Elements having the same function are provided with the identical reference symbols in FIGS. 2 and 3, unless otherwise stated.

According to the second exemplary embodiment, the receiver 1 has a first network interface IF1 to a network NW. The receiver 1 may use the network NW to communicate with a cloud offload server COS. The cloud offload server COS performs a portion of the signal processing. The cloud offload server COS has a second network interface IF2 to the network NW. In addition, the cloud offload server COS holds the provision unit 3 for the purpose of provision B of the secured replica pseudo random noise signal. A memory area M' is used to store the secured replica pseudo random noise signal 13 as a snippet, e.g., as a limited signal section. This may be a digitized signal segment that is provided for the network via the second network interface IF2 of the cloud offload server COS and hence for the receiver unit 2 of the receiver 1 via the first network interface IF1. In this example, the receiver unit 2 denotes the control unit CU, the baseband processing BB, the PVT component PVT, the radiofrequency assembly RFFE, the down converter DC, the analog/digital converter AD, the local oscillator LO and additionally a code memory M. By way of example, the protected replica pseudo random noise signal 13 is transmitted to the control unit CU of the receiver unit 2, which stores the replica pseudo random noise signal 13 in the code memory M provided for this purpose. From this code memory M, the correlator C may read the secured pseudo random noise signal 13 for the purpose of performing the correlation and may decode a received signal 130 that has the matching pseudo random noise code 100. The result of the correlation is forwarded to the PVT component PVT for the purpose of ascertaining a time offset.

The cryptographic replica pseudo random noise code 10K is generated outside a receiver 1 installed in the field, e.g., in order to facilitate key management. The cloud offload server COS may ask an appropriate key manager about currently valid keys and transmitters of expected received signals via secured communication links and in an environment protected against attackers. The critical transmission, to be protected against attacks, from a cloud server that provides a replica pseudo random noise code to a receiver is complex or, depending on the field of use, non-implementable. The use of the provision unit 3 according to the second exemplary embodiment allows more favorable transmission in the event of the computation of the cryptographic replica PRN code 10K or of a cryptographic replica PRN code section being effected on an external server. Hiding the cryptographic replica PRN code 10 in an artificially produced noise signal within the provision unit 3 and, for example, within the server COS prior to the transmission of a signal to the receiver 1 externally may allow the unsecured transmission of the cryptographic replica pseudo random noise code 10K to the receiver 1 via the network NW.

The entire server COS or alternatively just the provision unit 3 may be realized in protected form. The network NW may be a communication network, such as TETRA, UMTS, LTE, WLAN or WiMAX. The network NW may also be the Internet or a self-contained IP-based network.

An attacker manipulating the receiver 1 nevertheless cannot start a meaningful attack with a secured replica pseudo random noise signal 13 that may be read from the receiver 1, because the attacker cannot reconstruct a pseudo random noise code 10K from the signal. Hence, the receiver 1 cannot transmit a manipulated signal with a correct pseudo random noise signal, e.g., as a result of an attacker. An attack on the network connections within the network NW also continues to be unsuccessful, because the original cryptographic replica pseudo random noise code 10K is available only in secured form hidden in the noise signal 12.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing a secured replica pseudo random noise signal for a receiver, the method comprising:

generating a replica pseudo random noise signal from a replica pseudo random noise code;

modulating the replica pseudo random noise signal with a noise signal by a receiver-end processor; and generating the secured replica pseudo random noise signal from the replica pseudo random noise signal and the noise signal, wherein the replica pseudo random noise code is indistinguishable from the noise signal in the secured replica pseudo random noise signal, wherein the noise signal has a higher signal level than a signal level of the replica pseudo random noise signal, and wherein the noise signal is independent of the replica pseudo random noise code.

2. The method of claim 1, further comprising correlating the secured replica pseudo random noise signal with a received signal received by the receiver.

3. The method of claim 1, further comprising decoding a pseudo random noise code contained in a received signal received by the receiver via a correlation method using the secured replica pseudo random noise signal.

4. The method of claim 1, further comprising evaluating a pseudo random noise signal contained in a received signal received by the receiver via a correlation method.

5. The method of claim 1, further comprising generating the replica pseudo random noise code by a replica pseudo random noise code generator of the processor or by an external replica pseudo random noise code generator connected to the processor.

6. The method of claim 1, wherein the replica pseudo random noise code is a cryptographic replica pseudo random noise code.

7. The method of claim 1, wherein the noise signal is configured as a random noise signal or as a pseudo random noise signal.

8. The method of claim 1, wherein the modulating of the replica pseudo random noise signal with the noise signal by the processor further comprises adding the replica pseudo random noise signal to the noise signal.

9. The method of claim 1, further comprising generating the noise signal by a noise generator of the processor or by an external noise generator connected to the processor.

10. The method of claim 1, further comprising generating the signal level of the noise signal so as to be constant over time or so as to be variable over time.

11. The method of claim 1, further comprising providing the secured replica pseudo random noise signal for the receiver by a security module or by a security cloud server, either continuously or in individual sections or with addition of supplementary information.

12. The method of claim 1, wherein the secured replica pseudo random noise signal comprises a marker for identifying a signal produced at the receiver end processor.

13. The method of claim 1, wherein the generating of the replica pseudo random noise signal comprises modulating the pseudo random noise code.

14. A provision unit for providing a secured replica pseudo random noise signal for a receiver, the provision unit comprising:

a modulator configured to generate a replica pseudo random noise signal from a replica pseudo random noise code and to modulate the replica pseudo random noise signal with a noise signal; and a processor configured to generate the secured replica pseudo random noise signal from the replica pseudo random noise signal and the noise signal, wherein the replica pseudo random noise code is indistinguishable from the noise signal in the secured replica pseudo random noise signal, wherein the noise signal has a higher signal level than a signal level of the replica pseudo random noise signal, and wherein the noise signal is independent of the replica pseudo random noise code.

15. The provision unit of claim 14, wherein a pseudo random noise code contained in a received signal received by the receiver is decodable via a correlation method using the secured replica pseudo random noise signal.

16. The provision unit of claim 14, wherein the processor is configured to generate the replica pseudo random noise code.

17. The provision unit of claim 14, wherein the processor is configured to generate the noise signal.

18. The provision unit of claim 14, wherein the processor or a memory is configured to produce or store, respectively, a cryptographic key, and wherein the processor is configured to generate a cryptographic replica pseudo random noise code using the cryptographic key.

19. The provision unit of claim 14, wherein the processor is part of the receiver.

20. The provision unit of claim 14, wherein tamper-proofing to recognize manipulation or damage is provided for the processor.

* * * * *